United States Patent

McKee et al.

[15] 3,640,608
[45] Feb. 8, 1972

[54] AUTOMATICALLY CONTROLLED MIRROR

[72] Inventors: Clyde M. McKee, Taylor; Andrew V. Provenzino, Southgate; Ward Scott, Rochester, all of Mich.

[73] Assignees: Clyde M. McKee, Taylor; Ward Scott, Rochester, Mich.; Sandor Shapiro, , part interest to each

[22] Filed: Apr. 8, 1970

[21] Appl. No.: 31,039

Related U.S. Application Data

[62] Division of Ser. No. 706,953, Feb. 20, 1968, Pat. No. 3,536,382.

[52] U.S. Cl. ............................................350/307, 350/289
[51] Int. Cl. .........................................................G02b 5/08
[58] Field of Search..................350/288, 289, 299, 304, 302, 350/307; 74/501 M; 60/54.5, 54.5 HA; 92/13

[56] References Cited

UNITED STATES PATENTS

| | | | |
|---|---|---|---|
| 2,758,508 | 8/1956 | Petri et al. .............................350/289 |
| 2,854,892 | 10/1958 | Stark .....................................350/307 |
| 3,166,630 | 1/1965 | Esslinger................................350/299 |
| 3,208,343 | 9/1965 | Prochhow...............................350/302 |
| 2,330,444 | 4/1941 | Park ......................................350/304 |
| 2,626,539 | 1/1953 | Peterson..................................74/501 |
| 2,873,647 | 2/1959 | Bach.........................................95/13 |
| 2,988,957 | 6/1961 | Kotora....................................280/150 |
| 3,005,384 | 10/1961 | Baird et al. ............................350/289 |

*Primary Examiner*—David Schonberg
*Assistant Examiner*—Michael J. Tokar
*Attorney*—Hauke, Gifford and Patalidis

[57] ABSTRACT

A mirror assembly for trucks or the like actuated in response to movement of the steering wheel to move to a position providing maximum visibility. A cable assembly is clamped to a member which is pivotally movable upon rotation of the steering wheel in such a way that pivoting of the member produces axial movement of a cable. In one embodiment the cable is connected through a pivotal member to a second set of cables which actuate the mirrors and in another embodiment a hydraulic system is connected with the cable to actuate the mirrors.

5 Claims, 8 Drawing Figures

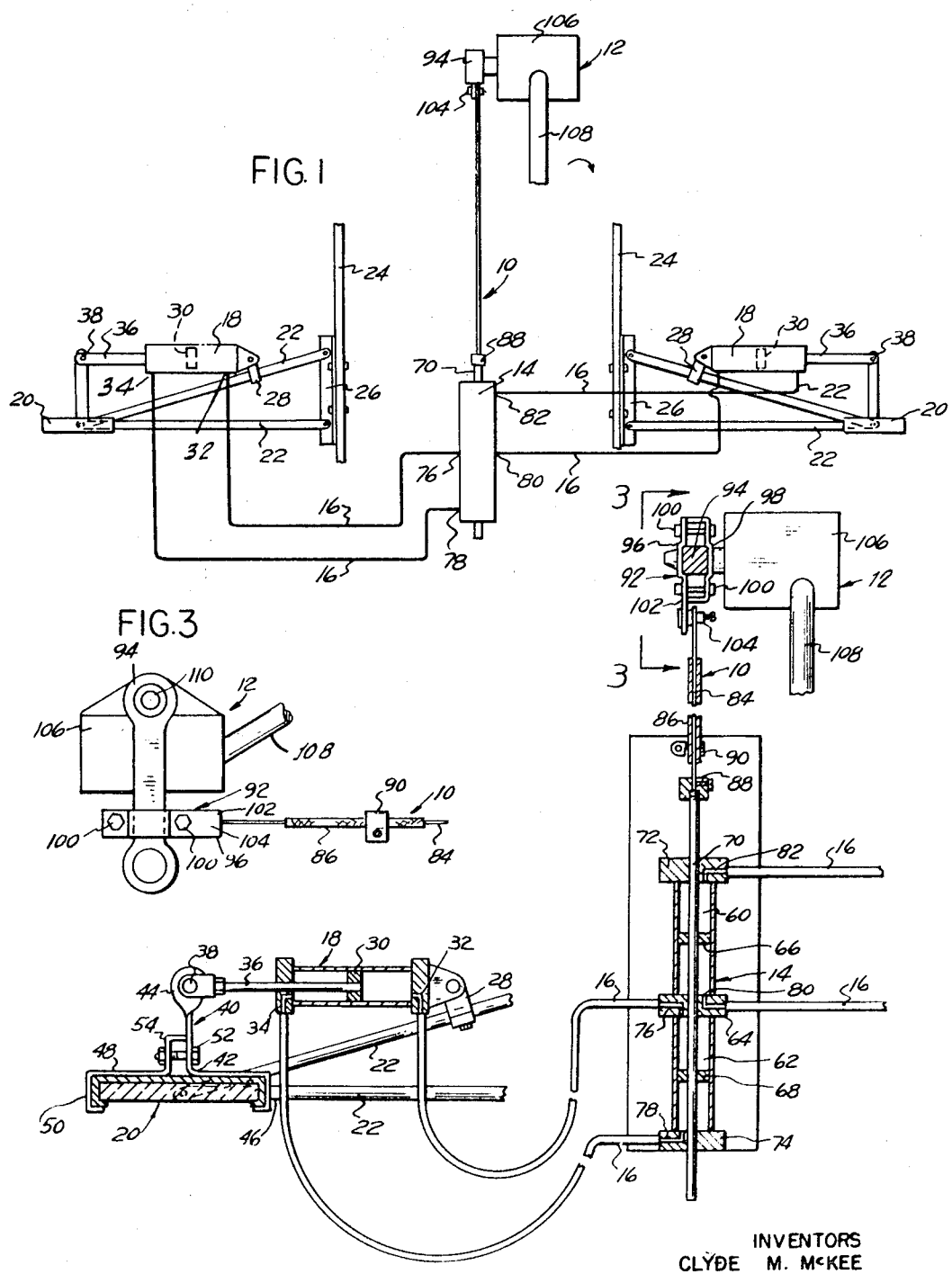

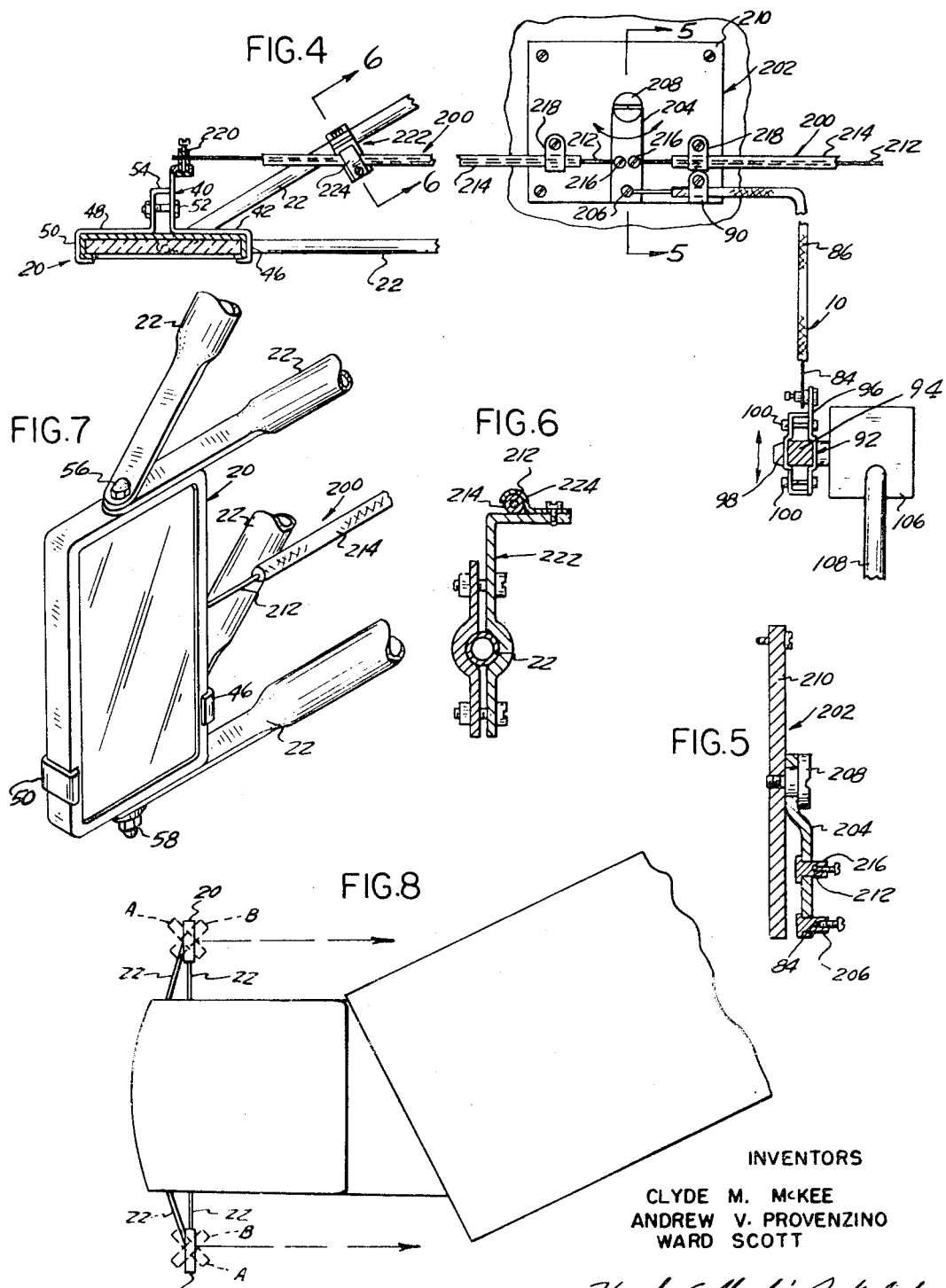

AUTOMATICALLY CONTROLLED MIRROR

The present application is a divisional application of Ser. No. 076,953 filed Feb. 20, 1968 and now U.S. Pat. No. 3,536,382.

BACKGROUND OF THE INVENTION

1. Field of The Invention

The present invention relates to exteriorly mounted rearview mirrors for trucks or the like and more particularly to means for automatically varying the position of the mirrors in response to movement of the steering wheel.

2. Description Of The Prior Art

Means have been heretofore provided to produce movement of exteriorly mounted vehicle mirrors as the vehicle is turning so that the rear of the vehicle remains in the vision of the driver throughout the turn. The problem of seeing the rear of the vehicle is a particularly difficult one where truck and trailer combinations are used and especially when a right-hand turn is being made. In such situations the setting of the mirror necessary for straight ahead driving causes the right-hand mirror to be directed against the side of the trailer when a right-hand turn is being made. The left-hand mirror in such situations is also of little use since it is directed toward an area away from the left side of the trailer throughout much of the turn. Similarly when making a left-hand turn the left-hand mirror will be directed against the left side of the trailer and the right-hand mirror will be well away from the right side of the trailer. This is not as critical as the right turn situation because the driver is positioned on the left side of the vehicle and is therefore in a better position to see that side of the vehicle.

Previous attempts to provide a solution to this problem have not met with success for several reasons. Heretofore, there has been no apparatus for ready attachment to existing trucks and mirror assemblies to convert them to automatically actuated devices. Such apparatus as has been previously suggested has required that the units be built into the structure of the truck itself or that extensive and expensive modifications be made on the vehicle to install new mirror assemblies to replace those already provided.

Further, the actuating mechanism for previously automatically controlled mirror assemblies, in addition to completely integrated mirror units, have also employed gearing arrangements which have made them quite expensive and subject to malfunction.

SUMMARY OF THE PRESENT INVENTION

The present invention provides actuating mechanism which can be readily connected between existing members in the steering mechanism and mirror assemblies commonly used in truck-trailer combinations to provide a movement of the mirrors in response to steering wheel movement in a manner which provides a maximum visibility while turning.

In each embodiment of the present invention a first cable assembly is clamped to a member of the steering mechanism which pivots in response to turning movement of the steering wheel. Pivotal movement of the member in either direction is translated through the cable assembly in one embodiment to a hydraulic system which in turn pivots each of the mirrors in the same direction and in a direction to aim the mirror on the side in the direction of turn outwardly so that the end of the trailer can be seen through the mirror. Rotation of the opposite mirror in the same direction will bring it inwardly toward the trailer so that it can be more useful as the vehicle is being turned. The connection between the mirrors and the actuating mechanism is by way of a clamp which will fit a large number of existing mirrors so that it is not necessary to provide a new mirror assembly for each installation.

In a second embodiment of the invention the cable assembly is connected with a second cable assembly which translates movement of the steering wheel to a corresponding pivotal movement of the mirrors.

DESCRIPTION OF THE DRAWINGS

A more complete understanding of the present invention will be apparent from the following description of several preferred embodiments. The description makes reference to the accompanying drawings in which like reference characters refer to like parts throughout the several views and in which:

FIG. 1 is a schematic view illustrating one preferred embodiment of the present invention;

FIG. 2 is a fragmentary view partly in section of a portion of the preferred embodiment illustrated in FIG. 1;

FIG. 3 is a fragmentary view substantially as seen from line 3—3 of FIG. 2;

FIG. 4 is a view similar to FIG. 2 but illustrating another preferred embodiment of the present invention;

FIG. 5 is a cross-sectional view taken substantially on line 5—5 of FIG. 4 and enlarged somewhat for purposes of clarity;

FIG. 6 is a cross-sectional view taken substantially on line 6—6 of FIG. 4 and enlarged somewhat for purposes of clarity;

FIG. 7 is an enlarged view illustrating the manner of attaching the actuating mechanism of the present invention to an existing mirror assembly; and FIG. 8 is a schematic view illustrating the manner of operation of mirror assemblies utilizing the actuating means of the present invention.

DESCRIPTION OF SEVERAL PREFERRED EMBODIMENTS

Now referring to the drawings for a more detailed description of the present invention one preferred embodiment thereof is shown in FIGS. 1–3 as comprising a cable assembly generally indicated by reference numeral 10 connected at one end to the steering mechanism 12 of a truck or the like and at the opposite end to a main fluid cylinder 14. The main cylinder 14 is connected by fluid lines 16 to auxiliary cylinders 18 which are in turn connected to pivotally mounted mirrors 20.

As can best be seen in FIG. 7 the mirrors 20 are of conventional construction and preferably are of the type which are pivotally mounted top and bottom to supporting struts 22 which in turn are secured to the side 24 (FIG. 1) of the vehicle by brackets 26.

As can best be seen in FIG. 2 the auxiliary cylinders 18 are each mounted by a clamp 28 to one of the struts 22 supporting the mirror 20 to which the particular cylinder 18 is attached. The cylinders 18 are alike in construction and are provided with a piston 30 movable in response to pressure introduced on opposite sides thereof through ports 32 and 34. Movement of the piston 30 produces movement of an arm 36 which is pivotally connected at 38 to a clamp assembly 40.

The clamp assembly 40, as can best be seen in FIG. 2, comprises a first substantially L-shaped member 42 having a twisted section 44 at one end to which the arm 36 is attached and a flange section 46 at the opposite end adapted to engage the edge of the mirror 20. A second substantially L-shaped member 48 is provided with a flange section 50 at one end which engages the edge of the mirror 20 opposite the flange section 46 so that when the members 42 and 48 are brought together the mirror 20 is securely clamped between the flange sections 46 and 50. A nut and bolt 52 provide the tightening means and the member 48 is provided with a bent portion 54 at the end opposite the flange section 50 which aids in directing the force produced by the nut and bolt 52 to produce the clamping action. Movement of the piston 30 causes the mirror 20 to pivot in a vertical axis about the two pivot points 56 and 58 (FIG. 7)

As can best be seen in FIG. 2 the main cylinder 14 is divided into two chambers 60 and 62 by a central porting member 64 and pistons 66 and 68 are respectively positioned in the chambers 60 and 62. The pistons 66 and 68 are joined by a rod 70 the ends of which extend through end caps 72 and 74.

One of the auxiliary cylinders 18 is connected to the chamber 62 on opposite sides of piston 68 by fluid lines 16 connecting through ports 76 and 78 provided in the central porting member 64 and the end cap 74 respectively and the other auxiliary cylinder 18 is connected to the chamber 60 on opposite sides of the piston 66 by fluid lines 16 and ports 80 and 82 provided in the central porting member 64 and the end cap 72 respectively.

Movement of the rod 70 then produces a corresponding movement of the pistons 66 and 68 to increase fluid pressure in chamber 60 and 62 respectively ahead of the pistons and to create a partial vacuum behind the pistons. Thus if the movement of the rod 70 is downwardly in FIG. 2 pressure would be increased at ports 78 and 80 and reduced at ports 76 and 82. The increase and decrease in fluid pressure at the ports 78 and 76 respectively is transmitted by the lines 16 to the ports 34 and 32 respectively of the auxiliary cylinder 18 to produce movement of the rod 36 to the right in FIG. 2. This will produce a clockwise pivoting of the mirror 20.

As can be seen in FIG. 1 port 80 of the main cylinder 14 is connected to the right-hand cylinder 18 on the left side of the piston 30 so that increased pressure at the port 80 and the reduced pressure at port 82 produced by downward movement of the rod 70 will produce movement of the rod 36 of the right auxiliary cylinder 18 to the right to also pivot the right hand mirror 20 in a clockwise direction.

The cable assembly 10 preferably comprises an inner cable or wire 84 (FIG. 2) axially movable within a guide tubing 86. One end of the cable 84 is joined to the end of the rod 70 by a connector 88 so that movement of the cable or wire 84 produces a corresponding movement of the rod 70. The guide tubing 86 is fixed at several points such as by clamps 90 so that the tubing 86 remains stationary as the cable or wire 84 is moved.

The opposite end of the cable 84 is connected to a clamp assembly 92 which is in turn clamped to a steering arm member 94. The clamp assembly 92 comprises a first member 96 and a second member 98 adapted to fit on opposite sides of the arm member 94 and to be secured together by nuts and bolts 100. The member 96 is provided with an extending portion 102 which swively carries a swivel fastener 104 for attachment to the end of the cable or wire 84.

The steering arm member 94 is a part of the vehicle and connects the steering gear mechanism 106 to the linkage means (not shown) for turning the front wheels of the truck in response to rotation of a steering shaft 108 by a steering wheel (not shown). Such a member is commonly called the Pittman arm and is included in every known truck in substantially the form shown. Thus rotation of the shaft 108 produces pivoting of the arm member 94 about the pivot point 110 (FIG. 3). This acts through the swivel connection 104 to produce movement of the inner cable or wire 84 to move the rod 70 accordingly and to thereby produce a positioning of the mirrors 20 which corresponds with the direction of rotation of the shaft 108. The direction of rotation of the shaft 108 of course depends upon the direction the vehicle is being turned and the arm 94 will pivot in a direction depending upon the direction of rotation of the shaft 108. The result is that the mirrors 20 will both be rotated in a counterclockwise direction when the vehicle is turning right and in a clockwise direction when the vehicle is turning left. In this way and by adjusting the clamping assembly 92 along the length of the arm 94 or by adjusting the position of the cylinders 18 to produce the desired amount of pivoting a maximum range of visibility can be achieved at each turning position of the vehicle.

FIGS. 4–6 illustrate another preferred embodiment of the present invention similar to the embodiment described above except that the fluid system including cylinders 14 and 18 have been replaced by a pair of cable assemblies 200 connected to the cable assembly 10 through a pivotal arm assembly 202.

The end of cable or wire 84 opposite the clamp assembly 92 is fastened to the free end of an arm 204 by a swivel connector 206 so that movement of the cable 84 by pivotal movement of the steering arm member 94 produces a corresponding pivoting of the arm 204 about a pivot connection 208 with a mounting plate 210. The cable assemblies 200 each comprise an inner wire or cable 212 movable within tubular guides 214 and having their ends connected to the arm member 204 by swivel connectors 216 so that pivoting of the arm member 204 produces axial movement of the cables or wires 212 within the guides 214. Clamps 218 fixed to the plate 210 retain the guides 214 in position while the cables or wires 212 are moving.

The opposite ends of the cables or wires 212 are mounted by swivel connectors 220 to the member 42 of bracket assembly 40 so that extension and retraction of the wires 212 produces a pivoting of the mirror 20 about the pivot connections 56 and 58 (FIG. 7). A clamp assembly 222 as shown in FIG. 6 mounts around one of the supports 22 and is provided with an L-shaped member 224 which clamps over the tubular member 214 to prevent it from moving as the wire 212 is moved.

Rotation of the shaft 108 produces pivotal movement of the steering arm member 94 in a direction which depends upon which direction the vehicle is being turned. If the vehicle is being turned to the left then the inner wire 212 connected to the mirror 20 on the left-hand side of the vehicle (the mirror shown in FIG. 4) will be moved to the right to rotate the mirror 20 in a clockwise direction and the inner wire 212 connected to the mirror 20 on the right-hand side of the vehicle (not shown in FIG. 4) will also be moved to the right to rotate the right-hand mirror in a clockwise direction. This would be accomplished by mounting the clamp assembly 92 to the steering arm member 94 in a manner which produces a pivoting of the arm 204 in a counterclockwise direction upon turning the vehicle to the left.

Turning the vehicle to the right then would produce clockwise rotation of the arm 204 to pivot the mirrors in a counterclockwise direction.

The desired position of the mirrors 20 is best illustrated in FIG. 8. The truck is therein illustrated as being turned to the right. The solid line representing the mirrors 20 illustrated what their position would be if no automatic adjustment means were provided. In such a position the view from the right-hand mirror would be the right-hand side of the trailer as illustrated by the arrow and the view from the left-hand mirror would be of an area well spaced from the left side of the vehicle as also illustrated by arrows.

With the actuating means of the present invention the mirrors would be positioned as shown in phantom at A during a right turn. The turn would cause the mirrors 20 to pivot counterclockwise so that the right hand mirror would be in a position so that the rear of the trailer can be seen. Similarly the left hand mirror 20 would be in position to permit at least a portion of the left side of the vehicle to be visible.

During a left-hand turn the mirrors 20 would be rotated in a clockwise direction toward the position shown in phantom at B to again produce maximum visibility.

It is apparent that we have described an automatic actuating means for positioning truck mirrors and the like which is readily adaptable to existing vehicle and mirror constructions. Many trucks are using mirrors like those illustrated herein and all vehicles have the steering arm member to which the present mechanism is designed to be attached. This attachment does not require expensive modifications of the vehicle and in many cases the existing mirrors can be used. There are a number of places within the mechanism where adjustments can be made so that any desired positioning of the mirrors can be achieved.

It is also apparent that although we have described several embodiments of our invention many other modifications and changes can be made without departing from the spirit of the invention as expressed by the scope of the appended claims.

We claim:

1. In combination with a vehicle having a pivotally mounted mirror and steering mechanism including a first member pivotally movable in response to turning of the vehicle, an actuating mechanism for pivoting said mirror comprising:

a second member axially movable and means connecting said second member to said first member to produce axial movement of said second member upon pivotal movement of said first member; and means translating axial movement of said second member to pivotal movement of said mirror.

2. The combination as defined in claim 1 and in which said last mentioned means includes a clamp member engaging said mirror and an axially movable member swively connected with said clamp member whereby axial movement of said member causes said mirror to pivot.

3. The combination as defined in claim 2 in which said axially movable member comprises a cable and said translating means further includes means connecting said second second member with said cable to produce axial movement of said cable upon axial movement of said second member.

4. The combination as defined in claim 1 and including a second mirror pivotally mounted to said vehicle and a second cable assembly connected with said lever member to produce pivotal movement of said second mirror upon axial movement of said second member.

5. The combination as defined in claim 1 and in which said first mentioned means comprises, a clamp member mounted to said pivotally movable member in a manner permitting radial adjustment; and a swivel connector carried by said clamp member and securing the end of said clamp.

\* \* \* \* \*